United States Patent [19]

Adomeit

[11] E Re. 30,707

[45] Reissued Aug. 11, 1981

[54] SAFETY BELT CLAMPING DEVICE

[76] Inventor: Heinz-Dieter Adomeit, Grolmanstrasse 16, 1 Berlin 12, Fed. Rep. of Germany

[21] Appl. No.: 51,257

[22] Filed: Jun. 22, 1979

Related U.S. Patent Documents

Reissue of:

[64] Patent No.: 4,120,466
Issued: Oct. 17, 1978
Appl. No.: 789,607
Filed: Apr. 21, 1977

U.S. Applications:

[63] Continuation of Ser. No. 593,710, Jul. 7, 1975, abandoned.

[30] Foreign Application Priority Data

Jul. 9, 1974 [DE] Fed. Rep. of Germany ..... 2432956

[51] Int. Cl.[3] ..... A62B 35/00; B65H 75/48

[52] U.S. Cl. ..... 242/107.2; 280/806; 297/478

[58] Field of Search ..... 242/107.2, 107.4 R-107.4 E, 242/75.2; 280/801-808; 188/65.1, 72.9, 72.4, 188; 226/195; 297/476-480

[56] References Cited

U.S. PATENT DOCUMENTS

| | | | |
|---|---|---|---|
| 2,705,529 | 4/1955 | Bull et al. . | |
| 3,003,589 | 10/1961 | Desbrow | 188/72.9 X |
| 3,205,004 | 9/1965 | Spouge . | |
| 3,323,831 | 6/1967 | Buechler | 242/107.2 X |
| 3,389,874 | 6/1968 | Van Noord | 242/107.2 |
| 3,425,645 | 2/1969 | Board et al. | 242/107.2 |
| 3,431,019 | 3/1969 | Lewis et al. . | |
| 3,439,932 | 4/1969 | Lewis et al. . | |
| 3,442,529 | 5/1969 | Lewis et al. . | |
| 3,467,337 | 9/1969 | Putman | 242/107.2 X |
| 3,494,571 | 2/1970 | Stoffel . | |
| 3,592,507 | 7/1971 | Gionet . | |
| 3,692,253 | 9/1972 | Curran | 242/107.4 R |
| 3,722,824 | 3/1973 | Hayashi | 242/107.4 A |
| 3,817,473 | 6/1974 | Board et al. | 242/107.2 |
| 3,817,474 | 6/1974 | Board et al. . | |
| 3,847,434 | 11/1974 | Weman | 242/107.2 X |
| 3,885,812 | 5/1975 | Lavenne . | |
| 3,886,374 | 5/1975 | Lefeuvre . | |
| 3,911,535 | 10/1975 | Mauron . | |
| 4,009,510 | 3/1977 | Lindblad . | |

FOREIGN PATENT DOCUMENTS

| | | | |
|---|---|---|---|
| 1928895 | 12/1970 | Fed. Rep. of Germany | 242/107.2 |
| 2414952 | 10/1975 | Fed. Rep. of Germany . | |

*Primary Examiner*—John M. Jillions
*Attorney, Agent, or Firm*—Roger H. Criss

[57] ABSTRACT

The invention relates to a device for clamping a safety belt to prevent it being unwound from a belt reel, the device consisting of a housing in which is provided a lever, one end of the lever being pivotably mounted in the housing, a clamping surface being provided on the lever intermediate its ends which co-operates with a clamping surface provided on the housing, the lever being resiliently urged to move about its pivot in a direction to separate the clamping surfaces. The belt is guided around the pivoted end of the lever, extends between the clamping surfaces and is guided around the free end of the lever, the resilient means applying a tension force to the belt. Movement of the lever against the force of the resilient means moving the clamping surface on the lever towards the clamping surface on the housing to clamp the belt therebetween.

8 Claims, 6 Drawing Figures

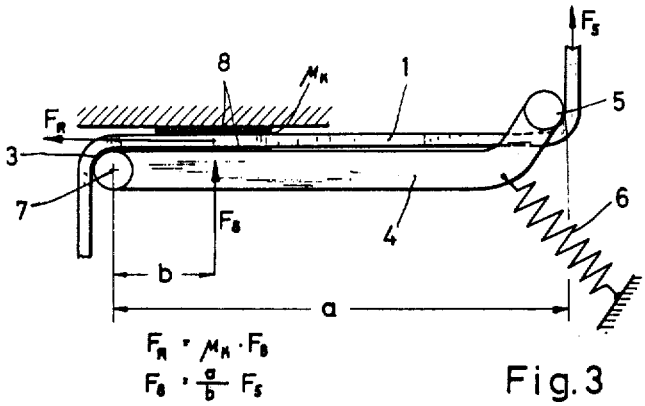
Fig. 3
Fig. 4
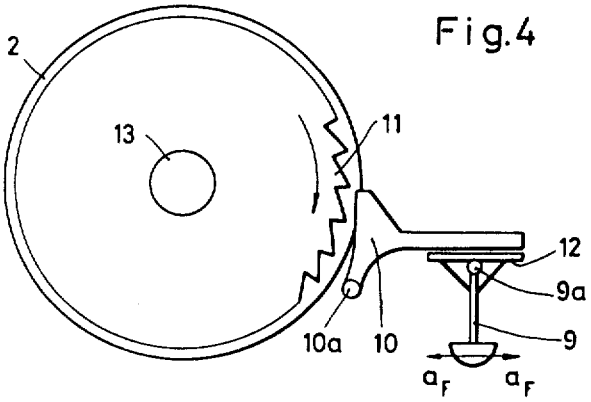

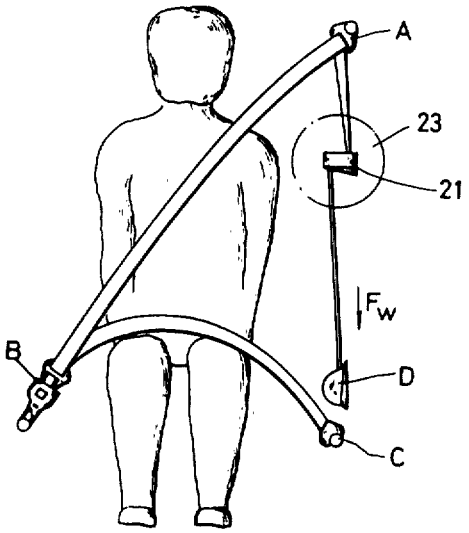
Fig. 5
Fig. 6
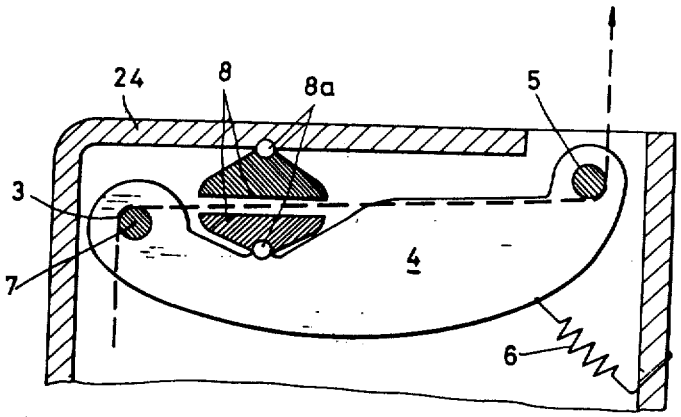

SAFETY BELT CLAMPING DEVICE

Matter enclosed in heavy brackets [ ] appears in the original patent but forms no part of this reissue specification; matter printed in italics indicates the additions made by reissue.

This is a continuation of application Ser. No. 593,710 filed July 7, 1975, abandoned.

BACKGROUND OF THE INVENTION

A 3-point automatic safety belt used at the present time is shown installed in an automobile in FIG. 1 of the accompanying drawings.

Automatic belt winding devices—hereinafter referred to as "automatic devices"—such as are used nowadays in 3-point automatic safety belts for automobile passengers, exert a constant retractive force $F_w$ on the belt between the belt anchorage points and belt guide points D, A, B and C (FIG. 1), pulling it around the passenger and drawing it back to the take-up reel (at point D), with the result that the shoulder belt between point A and point B constantly rests on the upper part of the passenger's body, although the passenger can bend forward against this retractive force $F_w$ and can move freely.

According to the known requirements which automatic devices must fulfil, the retractive force $F_w$ should be between 0.2 and 0.5 kp. In addition, the belting should "lock" under the following conditions:

1. if [F] *there* is a deceleration of the vehicle of [a*f*] $a_F > 0.4$ g in any arbitrary horizontal direction,
2. if the belt is drawn from the reel of the automatic device at an acceleration $a_{GB}$[22] $> 0.5$ g.

In the above $a_F$ = deceleration of the vehicle $a_{GB}$ = acceleration of the belt $g = 9.81\ m/s^2$ = acceleration due to gravity Devices are already known in which locking of the belt is effected adjacent to the take-up or winding reel. However, these have the great disadvantage that the belt is constantly contacting the lever braking surface as a result of the reel pulling effect, and friction is generated. The retractive forces are thus unnecessarily high. In addition, reliable locking is not guaranteed to a sufficient degree with the known devices. Besides, the necessary parts take up an unnecessarily large amount of space when installed. These known devices may not "hold" the belt in every case of acceleration of the belt or deceleration of the vehicle.

Very commonly proposed devices for locking the belt behind the winding reel by means of a "wedge effect" have the serious disadvantage that the belt is no longer released after locking has taken place. Besides, the locking process produces relative movement between the belt and locking surfaces which may tear the belt.

SUMMARY OF THE INVENTION

This invention relates generally as indicated to a device for clamping a safety belt to prevent it being unwound from a reel.

An object of the invention is to provide an improved automatic locking device so that the belt will be reliably locked and can be released after locking once the influence causing it to operate is no longer acting, without any danger of the belt being torn during locking as a result of relative movements between belt and locking surfaces, and locking forces transverse to the perpendicular force direction.

In accordance with the invention, this problem is solved by passing the belt in a frictionless manner between two guide points, over or under the locking lever, and between the locking surfaces, said locking surfaces being practically parallel to one another when actuated and locking being effected by a substantially purely perpendicular force (force at right angles) produced by the kinematics of motion of the lever-side locking surface, and, finally, by arranging the lever at a lever ratio b/a so that at most the locking coefficient $\mu_K$ of the pair of factors: [beltlocking] *belt-locking* surface in any particular case is reached. A possible arrangement of the afore-mentioned kinematics of motion is an "articulated" or pivoted arrangement of the locking lever so that the lever-side locking is perpendicular to the tangent to the circle of motion around this pivoting point. With the above-mentioned optimum lever ratio b/a the perpendicular locking force for the locking coefficient $\mu_K$, fixed in any particular case, will remain as small as possible without any danger of the belt not being held between the locking surfaces. The belt fabric is preserved by this perpendicular force being kept as small as possible.

According to the invention it is also advantageous if one of the two locking surfaces is arranged so that it can be tilted. In this way the aim regarding the kinematics of motion of the locking lever, namely that locking will take place under the action of a force which is as purely perpendicular as possible, will in addition be achieved. This is effected for example by a pivoted, tiltable arrangement of the locking surface in the locking lever or housing the pivoting-tilting axis being parallel to the locking lever pivot and thus generally transverse to the belt withdrawal direction.

In an advantageous modification of the invention, a winding reel arresting device sensitive to acceleration of the vehicle and which is known per se is provided, and acts on the locking lever. The purpose of this is to initiate locking of the belt, for example in such a way that when the winding reel is stopped the belt withdrawal force can increase and the locking lever is thereby brought into the locking position against its restraining elastic force. After the belt has been locked the perpendicular locking force is only still dependent on the belt withdrawal force, whereupon the winding reel arresting device is momentarily not subject to any force.

BRIEF DESCRIPTION OF THE DRAWINGS

To the accomplishment of the foregoing and related ends, the invention then comprises the features hereafter fully described and particularly pointed out in the claims, the following description and annexed drawings setting forth in detail a certain illustrative embodiment of the invention, this being indicative however of but one way in which the principle of the invention may be employed.

In said annexed drawings:

FIG. 3 is an enlarged view of the upper part of FIG. 2, FIG. 4 shows a vehicle acceleration sensing device for arresting the winding reel of the belt, FIG. 5 shows the installation of the automatic locking device in a housing separate from the winding reel, and FIG. 6 shows another embodiment of automatic clamping device in which the clamping surfaces are arranged in a pivoted manner.

DESCRIPTION OF THE PREFERRED EMBODIMENTS

Figure 2:
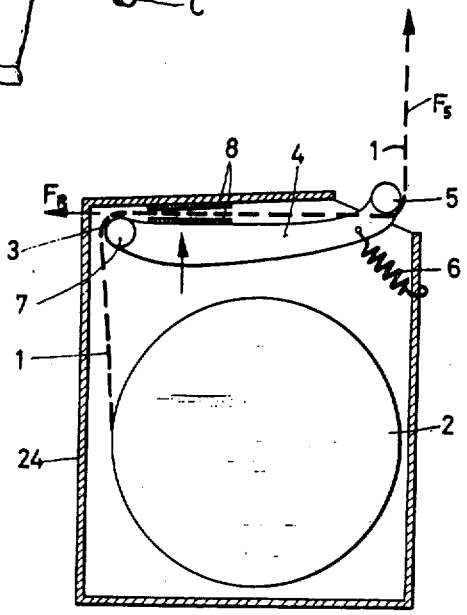
FIG. 2 shows a first embodiment of an automatic clamping device according to the present invention, diagrammatically and partly in section, in which locking surfaces, locking lever and winding reel are arranged in a housing.

The embodiment shown in FIGS. 2 and 3 comprises a housing 24 in which is housed a reel 2 for the safety belt 1. Pivotably mounted in the housing by a pivot 7 is a lever 4 having at its ends guide means 3 and 5. Provided on the lever 4 intermediate its ends is a clamping member 8 which co-operates with a clamping member 8 provided on the housing 24.

The belt 1 is guided from the spring-actuated winding reel 2 to the guide means 3 and extends over the lever 4, passing between the clamping members 8, to the guide means 5, and thence passes upwards from the automatic clamping device.

Figure 1:
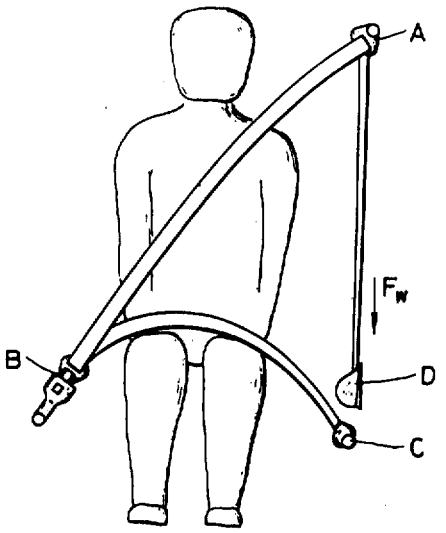
FIG. 1 shows the installation of a 3-point automatic safety belt.

The guide means 3 and 5 may each be formed as a reel or as a simple steel hoop. The lever 4 is held in its rest position (FIG. 1) by a spring 6 so that the belt has a tension force applied to it and the belt 1 can roll up and unroll freely.

Locking or clamping of the belt 1 is produced by upward movement of the locking lever 4 around the pivot 7 against the force of the spring 6, and this effects clamping of the belt 1 between the clamping surfaces 8. At least one of the surfaces 8 can be provided on a tiltably mounted member, tiltable on a pivot 8a as shown in FIG. 6 which is transverse to the belt withdrawal direction. By means of the leverage a which extends from pivot 7 to the guide means 5 and with the belt drawing tension $F_5$, a fairly large locking force $F_8$ is produced at a distance b by the leverage, the force $F_8$ acting at the centre point of the clamping surfaces 8 (in this case for example the leverage b:a = 1:4, $F_8 = 4F_5$).

Taking the most unfavourable case, namely that there are no frictional forces acting at the guide means 5, then for a satisfactory clamping the locking force at right angles $F_8$ compared with $F_5$ must be so large, by the arrangement of the leverage, that it can produce the retaining force (frictional force) $F_R = F_5$, taking into account the locking coefficient (coefficient of friction) $\mu_K$ (see FIG. 3). This means:

$$[F_{\cdot}\mu_K \leqq F_5]\ F_8 \cdot \mu_K \leqq F_5$$

or for the above example this means that with the existing leverage of 1:4, $\mu_K$ must be greater than 0.25 for a satisfactory locking to take place.

FIG. 4 illustrates an example of arresting the winding reel 2 for locking to take place at a vehicle deceleration of 0.4 g in any arbitrary direction. A small pendulum 9 with a link 9a urges a catch 10 with a pawl 10a against a toothed wheel 11 mounted axially on the winding reel 2, and stops the axle 13 of the said winding reel 2. All the actuating elements for this action may be small and light since they only have to exert slight retaining forces to overcome the elasticity of the retaining springs 6 of the locking lever 4 so that the said locking lever 4 comes into the locking position. Following this force $F_8$ increases constantly with increasing $F_5$ and ensures locking of the belt, whereupon the arresting device is momentarily not subject to any forces.

FIG. 2 illustrates the locking procedure for a belt acceleration greater than 0.5 g. The retaining spring 6 of the locking lever 4 should so be arranged with regard to its characteristic and initial tension force that as a result of the friction at the guide means 3 and 5, the [refractive] *retractive* force $F_W$ (FIG. 1) and the inertia of the winding reel 2 produce a tilting of the locking lever 4 against the elastic force of the spring 6 in the locking position.

If the locking device 23 (FIG. 5) is not provided with a winding reel 2 which is in a separate housing 21 (FIG. 5), there is the possibility of having the locking device [25] *23* at any desired position on the vehicle door pillar, and in the most favourable case of mounting it in conjunction with the guide fitment A. In this way the length of the expandable part of the belt 1 can be altered so that the maximum possible pre-displacement of the passenger can be utilised in the event of an accident.

All the above-described advantages can thus be achieved by subsequent installation in conjunction with automatic belt roll-up devices of known construction.

I, therefore, particularly point out and distinctly claim as my invention:

1. A vehicle safety belt retractor, comprising:

a. a housing;

b. a winding drum being rotatably mounted on said housing;

c. belt means attached to said winding drum for protraction and retraction with respect thereto;

d. clamp means for clamping said belt to prevent sudden protraction thereof, said clamp means including:

(i) a first fixed planar clamping surface;

(ii) a lever pivotally mounted at one end thereof; and (iii) a second displaceable planar clamping surface carried by the intermediate portion of said lever for movement from a rest position toward said fixed clamping surface to clamp the belt therebetween;

e. resilient means coupled to said lever for biasing said lever for movement about its pivot in a direction to urge the second clamping surface carried by said lever away from said first clamping surface;

f. first guide means mounted adjacent said one end of said lever for guiding said belt means;

g. second, displaceable, guide means carried by the other end of said lever for entrainment of said belt means thereabout, and operating in response to preselected abnormal tension of said belt to pivot said lever and thereby move said second clamping surface toward said first clamping surface;

said belt means normally extending off said winding drum to said first guide means, past said pivot, thence between said clamping surfaces without contact therewith and thence over said second guide means whereby in normal operation the retractor allows always free winding and unwinding of the belt between said clamping surfaces without contact therewith, but where a predetermined abnormal tension on the belt applies a force to said lever via the second guide means to actuate said lever into its clamping position against the bias of said resilient means in a substantially normal direction with no wedging action, said planar clamping surfaces being substantially parallel to the plane of the web at the point of contact therewith.

2. Apparatus according to claim 1 wherein at least one of said clamping surfaces is pivotally mounted.

3. A vehicle safety belt retractor, comprising:

a. a housing;

b. a winding drum being rotatably mounted on said housing;

c. belt means attached to said winding drum for protraction and retraction with respect thereto;

d. clamp means for clamping said belt to prevent sudden protraction thereof, said clamp means including (i) a first fixed planar clamping surface carried by said housing;

(ii) a lever pivotally mounted at one end thereof on said housing; and (iii) a second displaceable planar clamping surface carried by the intermediate portion of said lever for movement from a rest position toward said fixed clamping surface to clamp the belt therebetween;

e. resilient means coupled to said lever for biasing said lever for movement about its pivot in a direction to move the second clamping surface carried by said lever away from said first clamping surface;

f. first guide means carried by said housing for guiding said belt means;

g. second, displaceable, guide means carried by the other end of said lever for entrainment of said belt means thereabout, and operating in response to preselected abnormal tension of said belt to pivot said lever and thereby move said second clamping surface toward said first clamping surface;

said belt means normally extending off said winding drum to said first guide means, past said pivot thence between said clamping surfaces without contacting same and thence over said second guide means whereby in normal operation the retractor allows always free winding and unwinding of the belt between said clamping surfaces without contact therewith, but where a predetermined abnormal tension on the belt applies a force substantially perpendicular to said lever to actuate said lever into its clamping position against the bias of said resilient means in a substantially normal direction with no wedging action, said planar clamping surfaces being substantially parallel to the plane of the web at the point of contact therewith;

said belt in its operative condition extending away [fronm] *from* said second guide means in a direction substantially perpendicular to its path as it approaches said guide means.

4. Apparatus according to claim 3 wherein said clamping surfaces are both pivotally mounted.

*5. A seat belt clamp apparatus comprising:*

*a housing;*

*a lever pivotably mounted in said housing, said lever having a clamping position and a non-clamping position with respect to a seat belt which is movable through said clamp apparatus;*

*means biasing said lever to its non-clamping position;*

*means responsive to a force above a predetermined amounted applied to said belt in a first direction to move said lever toward said belt to its clamping position against the force of said biasing means;*

*clamping means provided on said lever for clamping said belt to resist movement of said belt in said first direction in response to said force above a predetermined amount;*

*first and second opposite surfaces on said clamping means;*

*means on said first surface of said clamping means defining a planar contact area for contacting said belt, said first surface normally being out of contact with said belt; and*

*means for pivotably mounting said second surface of said clamping means on said lever, said second surface of said clamping means being pivotable with respect to said lever about a pivot axis directly opposite to said contact area, whereby said contact area is moved into substantially parallel engagement with the major plane of said seat belt in response to said force above a predetermined amount, thereby resisting movement of said belt in said first direction.*

*6. The seat belt clamp apparatus of claim 5 including a planar clamping surface on said housing, said planar clamping surface on said housing cooperating with said planar contact area of said clamping means to provide clamping of said belt without any wedging action.*

*7. The seat belt clamp apparatus of claim 6 wherein said planar clamping surface is pivotally mounted on said housing.*

*8. The seat belt clamp apparatus of claim 5 wherein said clamping means is located adjacent to one end of said lever.*

* * * * *